(12) United States Patent
Birman et al.

(10) Patent No.: US 11,002,902 B1
(45) Date of Patent: May 11, 2021

(54) TICK MARK LUMINANCE ADJUSTMENT TOOL

(71) Applicant: Continental Automotive Systems, Inc., Auburn Hills, MI (US)

(72) Inventors: Vyacheslav Birman, Auburn Hills, MI (US); Matthew Sherman, Lake Orion, MI (US); Kevin Dyer, Macomb Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/677,821

(22) Filed: Nov. 8, 2019

(51) Int. Cl.
*F21V 8/00* (2006.01)
*B60K 35/00* (2006.01)

(52) U.S. Cl.
CPC ........... *G02B 6/006* (2013.01); *G02B 6/0036* (2013.01); *G02B 6/0068* (2013.01); *B60K 35/00* (2013.01); *B60K 2370/336* (2019.05); *B60K 2370/695* (2019.05)

(58) Field of Classification Search
CPC ................................................ B60K 2370/341
See application file for complete search history.

(56) References Cited

U.S. PATENT DOCUMENTS

| | | | | |
|---|---|---|---|---|
| 7,798,091 B2 * | 9/2010 | Suita | ...................... | B60K 37/02 116/287 |
| 9,829,371 B2 * | 11/2017 | Otani | ...................... | G01G 23/32 |
| 10,260,917 B2 * | 4/2019 | Otani | ...................... | B60K 35/00 |
| 10,576,882 B2 * | 3/2020 | Birman | ...................... | B60Q 3/14 |
| 2003/0090886 A1 * | 5/2003 | Eckardt | ................... | B60K 37/02 362/602 |
| 2009/0103278 A1 * | 4/2009 | Miyashita | .............. | B60K 37/02 362/23.18 |
| 2011/0051393 A1 * | 3/2011 | Ishikawa | ................ | G01D 11/28 362/23.19 |
| 2013/0027902 A1 * | 1/2013 | Miyazawa | ........... | G02B 6/0036 362/23.14 |
| 2013/0114240 A1 * | 5/2013 | Makita | .................... | G01D 13/28 362/23.19 |
| 2014/0261153 A1 * | 9/2014 | Mochizuki | ............. | G01D 11/28 116/28 R |
| 2015/0096487 A1 * | 4/2015 | Mochizuki | ............. | G01D 13/20 116/286 |
| 2015/0151668 A1 * | 6/2015 | Birman | ................ | B60Q 1/0017 362/23.21 |
| 2016/0091346 A1 * | 3/2016 | Otani | ...................... | G01D 11/28 362/23.16 |
| 2018/0361920 A1 * | 12/2018 | Birman | ................ | G02B 6/0068 |
| 2019/0323867 A1 * | 10/2019 | Birman | .................... | G01D 7/00 |

FOREIGN PATENT DOCUMENTS

DE        102018210631 A1 *  1/2019  ............. B60K 37/02

* cited by examiner

*Primary Examiner* — Alexander K Garlen

(57) ABSTRACT

A gauge assembly includes a gauge surface including at least one graphic, which may be a plurality of graphics defining a scale in a generally circular pattern on the gauge surface. A light guide has a main body portion disposed adjacent to the gauge surface and corresponding to the shape of the gauge surface. The light guide has a plurality of raised tick marks extending from the main body portion. The light guide is configured to provide illumination to the illuminable graphic(s) and the plurality of tick marks. A light housing disposed a light housing disposed adjacent to the light guide, the light housing having at least one light housing opening disposed adjacent to at least one of the plurality of raised tick marks.

14 Claims, 5 Drawing Sheets

TICK MARK LUMINANCE ADJUSTMENT TOOL

TECHNICAL FIELD

The present disclosure relates to vehicle instrument panels and clusters, and more specifically to a vehicle instrument panel that includes a tick mark luminance adjustment tool.

BACKGROUND

Vehicles include instrument panels to communicate information indicative of operation to an operator. Motor vehicles include instrument panels with several gauges and dials that communicate vehicle conditions such as speed, engine rpm, temperature, and oil pressure along with many other operational parameters. A gauge surface can be illuminated to provide a desired aesthetic appearance. Planar light guides and/or LEDs are typically utilized for propagating light to desired locations, however, light is not always evenly distributed.

One set of LEDs, including perhaps 2-4 LEDs may be used to illuminate graphics contained on an appliqué. Another set of LEDs, such as 4-6 LEDs may be distributed in a circular pattern about the appliqué in order to illuminate a set of tick marks disposed in a circular pattern the appliqué.

Chaplets or raised tick marks are illuminated as a gauge indicator or decorative component directly through a backlit LED or lighting system utilizing LEDs. The luminance level of the chaplets through prior designs has been direct resultant of the LED performance and the efficiency of the light rejecting components. The reflecting surface is continuous and uninterrupted to reduce luminance loss.

With conventional designs, there is limited opportunity within a continuous reflecting surface to adjust lighting performance or luminance significantly of a chaplet or raised tick mark. Surrounding illuminated graphics of an applique may be utilizing a different lighting system or have an inherent lower level of performance due to ink layers required. Having significantly different levels of luminance on gage indication within the same subject (applique graphic vs. tick mark) could be considered distracting, unpleasant, or undesirable to the driver.

SUMMARY

A light guide is provided that may provide light to a gauge surface, of, for example, and automotive instrument cluster. The light guide provides light to illuminate graphics on the gauge surface, as well as to light up tick marks.

In one or more embodiments, which may be combined with or separate from the other forms provided herein, a gauge assembly is provided including a gauge surface having at least one illuminable graphic defined thereon, the gauge surface defining a plurality of openings therethrough, and a light guide having a main body portion disposed adjacent to the gauge surface. The light guide has a plurality of raised tick marks extending from the main body portion, each tick mark of the plurality of tick marks extending through an opening of the plurality of openings, the light guide including a first end and a second end, at least one of the first end and the second end curve away from the gauge surface to receive light, the light guide being configured to provide illumination to the at least one illuminable graphic and the plurality of tick marks. The gauge assembly further includes a light housing disposed adjacent to the light guide, and the light housing having at least one light housing opening disposed adjacent to at least one of the plurality of raised tick marks.

In one or more embodiments, the light housing has at least one light housing opening disposed adjacent to each of the plurality of raised tick marks.

In one or more embodiments, the plurality of tick marks is unitarily formed with the main body portion.

In one or more embodiments, the light guide is at least one of transparent and translucent.

In one or more embodiments, the at least one light housing opening is defined in part by an inner surface, the inner surface having a surface roughness.

In one or more embodiments, the main body portion of the light guide having a forward surface and a rear surface, the main body portion having surface roughness formed on the forward surface and on the rear surface.

In one or more embodiments, the gauge assembly further includes a printed circuit board and a plurality of light sources disposed on the printed circuit board, the light sources being configured to emit light into the light guide, the light sources being disposed adjacent to the ends of the light guide.

In one or more embodiments, the light housing opening has a generally rectangular cross-sectional shape.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

Examples are reflected in the drawings, which will be described below. The drawings described herein are for illustration purposes only and are not intended to limit the scope of the present disclosure in any way.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1:
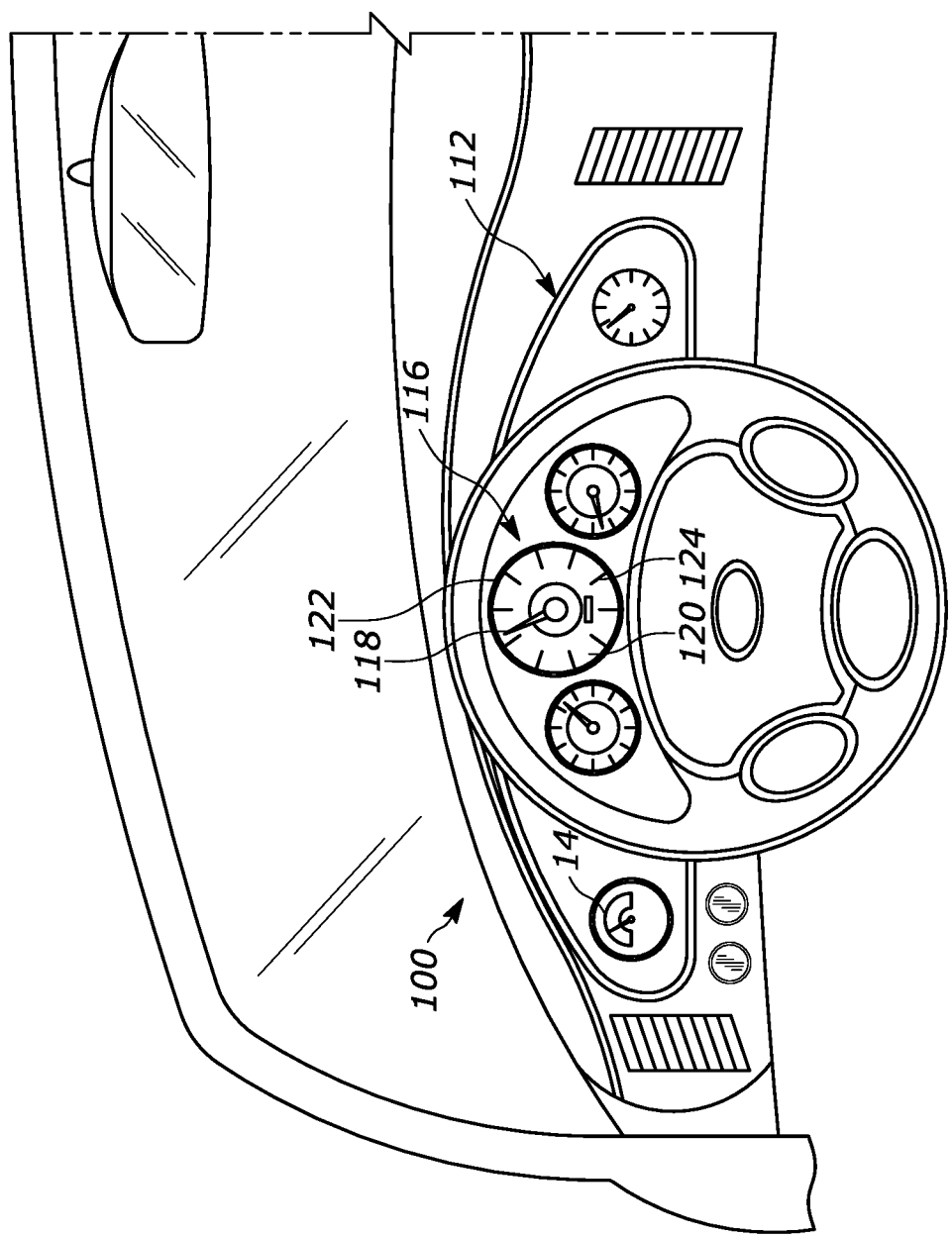
FIG. 1 is a cross-sectional view of a portion of a prior art gauge assembly.
Figure 2:
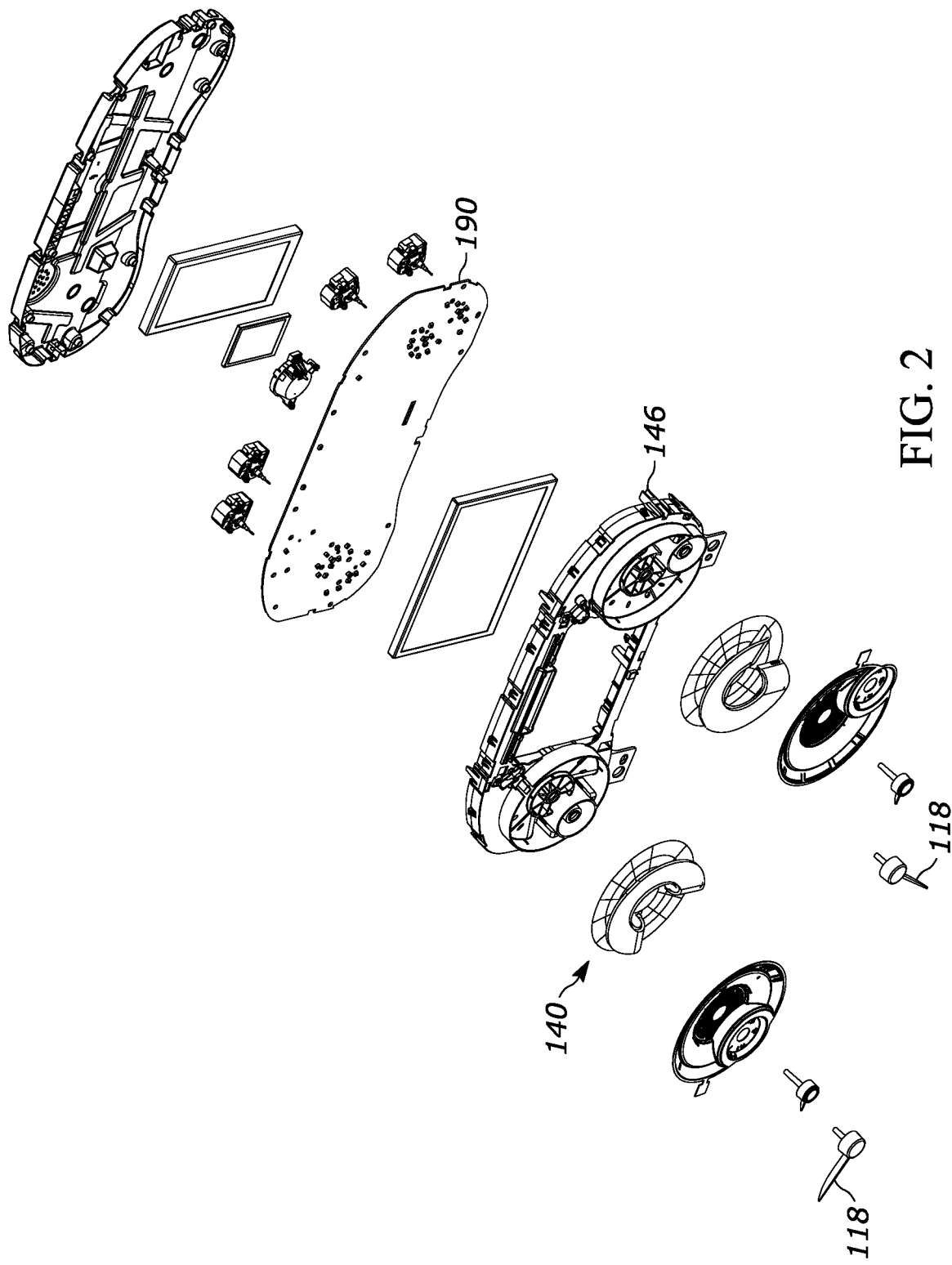
FIG. 2 is a schematic view of an example vehicle dashboard and instrument panel including a gauge assembly, according to one or more embodiments.
Figure 3:
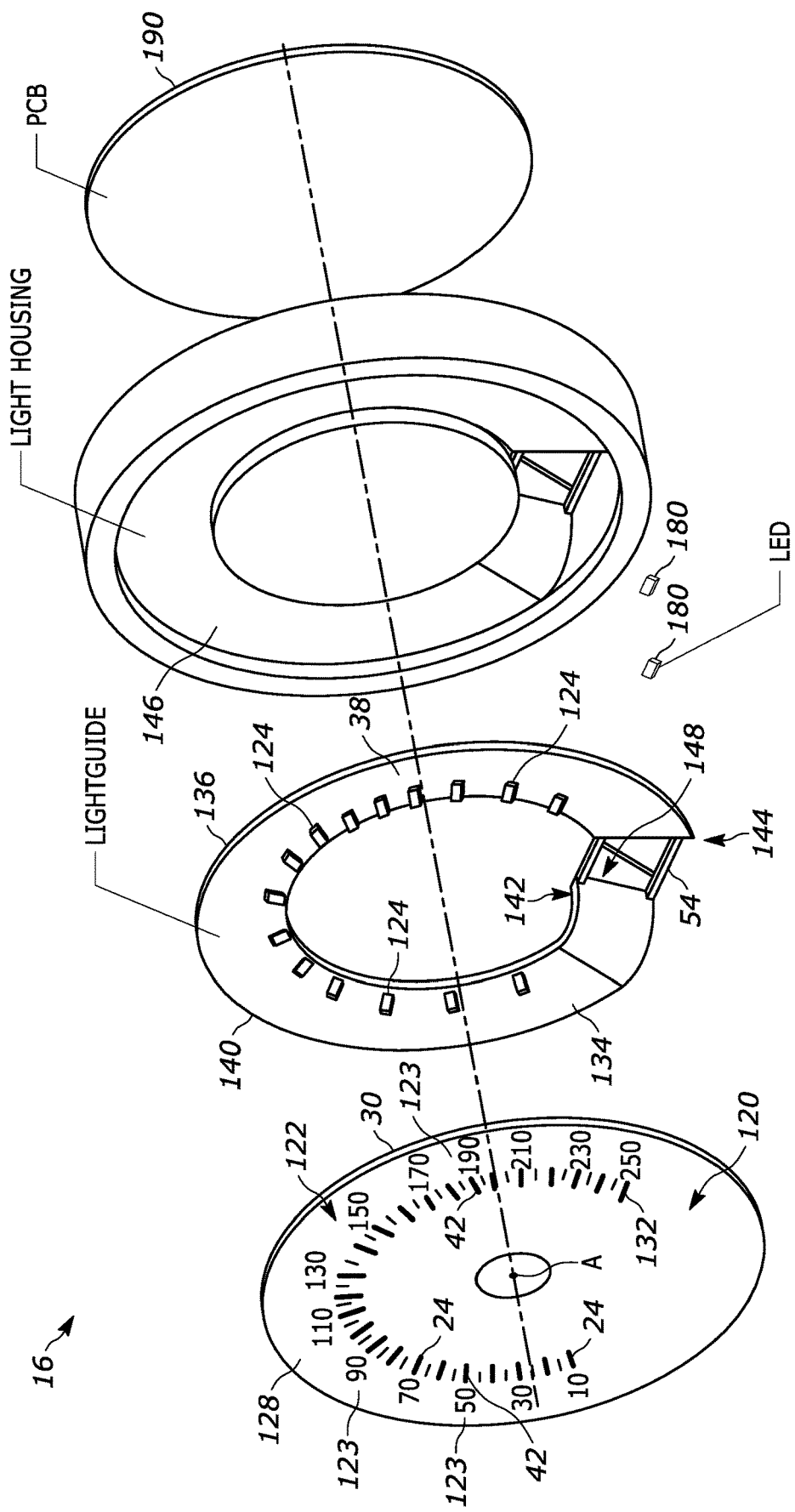
FIG. 3 is an exploded perspective view of a gauge assembly, according to one or more embodiments.
Figure 4:
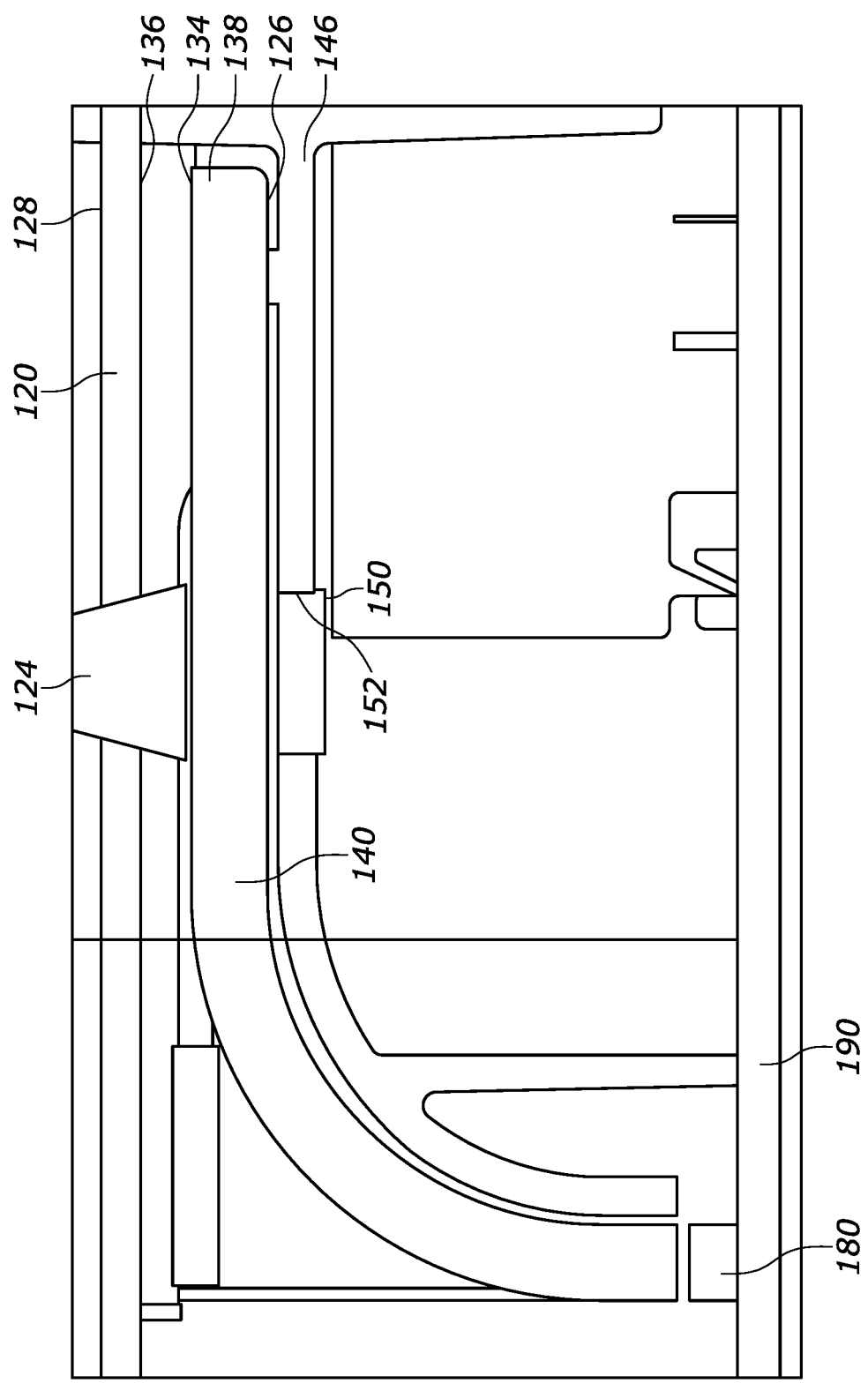
FIG. 4 is a cross-sectional view of a portion of the gauge assembly, in accordance with one or more embodiments.
Figure 5:
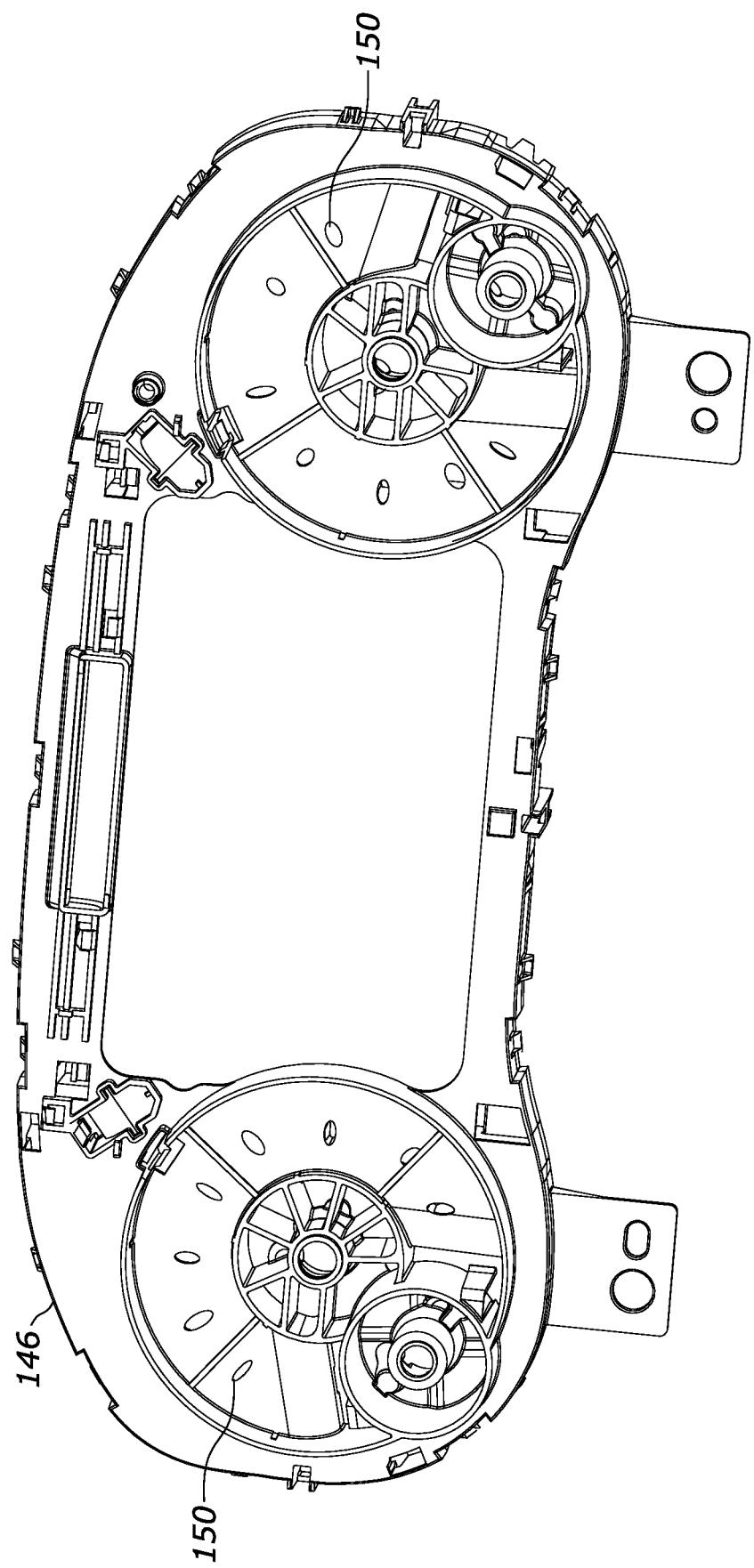
FIG. 5 is a perspective view of a light housing, according to one or more embodiments.

Referring to FIG. 1, a vehicle dashboard 100 is shown and includes an instrument panel 112 that includes a main gauge assembly 116 and accessory gauges. With reference now to FIGS. 1-2, the main gauge assembly 116 includes a gauge surface 120 with a scale or other graphics 122 that are illuminable. Illuminable tick marks 124 are also included adjacent to the graphics 122 or other graphics.

The gauge assembly 116 may include a pointer 118 that rotates about a central axis to indicate a specific value on the graphics 122. In this example, the gauge assembly 116 is a speedometer or tachometer; however, other gauges are also within the contemplation of this disclosure. The pointer 118 may be supported on a shaft driven by a stepper motor mounted to a printed circuit board 190. A light source 180 may be disposed along or adjacent to the central axis for illuminating the pointer 118.

The gauge surface 120 may be an applique. The graphics 122 (which includes graphic numerals 123) is disposed in a circular pattern about the central axis, in this example. The graphics 122 may be formed on the gauge surface 120. The graphic numerals 123 or other graphics may be formed as openings or surface roughness or translucent portions of the gauge 120, by way of example.

Referring now to FIGS. 2-5, the graphics 122 (including the graphic numerals 123) are illuminated by a light guide 140, which is disposed about the central axis adjacent to a rear side 136 of the gauge surface 120. The light guide 140 receives light from one or more light sources 180 mounted to the printed circuit board 190. For example, two light sources 180 or any plurality of light sources 180, such as four light sources 180, may be used to illuminate the light guide 140. The light sources 180 are light emitting diode (LED) packages, however other known light sources are within the contemplation of this disclosure.

The light guide 140 may be planar, or as shown in this example, the light guide 140 as viewed from a forward surface 134. Therefore, in this example, the light guide 140 is not disposed within a single plane. For example, both the light 140 and the gauge surface 120 may have corresponding curvatures. The geometric shape of the light guide 140 and the gauge surface 120 may be round and concave.

In addition to the graphics 123, the gauge assembly 116 includes a plurality of tick marks 124. In this example, the light guide 140 has a main body portion 138 disposed adjacent to the rear surface 136 of the gauge surface 120. The main body portion 138 may have a shape corresponding to the shape of the gauge surface 120. The plurality of raised tick marks 124 extend from the main body portion 138. The tick marks 124 may have a substantially rectangular shape, in some examples. The tick marks 124 may be unitarily formed with the main body portion 138, or otherwise attached to the main body portion 138. For example, both the main body portion 138 and the tick marks 124 may be unitarily formed as one piece by injection molding PMMA (acrylic). The light guide 140 may be translucent or transparent, by way of example.

The gauge surface 120 has a viewing side 128, which is the side of the gauge surface 120 that is viewable by a driver or passenger, by way of example. Both the graphics 122 and the tick marks 124 are visible via the viewing side 128. Thus, the tick marks 124 are viewable by way of the viewing side 128, even though the light guide 140 is disposed "behind" the gauge surface 120, adjacent to the rear side 136 of the gauge surface 120. In order for the tick marks 124 to be visible on the viewing side 128, the tick marks 124 are viewable either through openings in the gauge surface 120 or through windows (translucent or transparent portions) of the gauge surface 120.

In the illustrated example, the gauge surface 120 defines a plurality of openings 132 (which may be cutouts), through which the raised tick marks 124 extend. Thus, each tick mark 124 of the plurality of tick marks 124 extends through an opening 132 of the plurality of openings 132. Therefore, the tick marks 124 are viewable from the viewing side 128 of the gauge surface 120.

The light guide 140 includes a first end 142 and a second end 144 that each curve away from the gauge surface 120 to receive light. The ends 142, 144 are disposed adjacent to each other and the ends 142, 144 define a gap 148 therebetween. A structural piece may optionally connect the first and second ends 142, 144 for stability.

The plurality of light sources 180 may be disposed on the printed circuit board 190, by way of example. The light sources 180 are configured to emit light into the light guide 140. For example, the light sources 180 are disposed adjacent to the ends 142, 144 of the light guide 140. A first light source 180 is configured to emit light into the first end 142, and a second light source 180 is configured to emit light into the second end 144. The ends 142, 144 curve toward the light sources 180, and each end 142, 144 defines a light receiving surface exposed to and adjacent to the light sources 180. Light rays propagate through the curved concave shape of the light guide 140 about the central axis. The geometric shape of the light guide 140 propagates the light rays around the light guide 140. For example, the light rays are reflected through the light guide 140 off of the forward and rear surfaces 134, 136 to emit light toward the tick marks 124 and the graphics or graphics 122.

The main body portion 138 of the light guide 140 has a forward surface 134 and a rear surface 126. The forward surface 134 is disposed directly adjacent to the rear surface 136 of the gauge surface 120. The rear surface 126 of the main body portion 138 is disposed adjacent to a light housing 146 and/or the printed circuit board 190. In one example, the main body portion 138 of the light guide 140 is sandwiched between the gauge surface 120 and the light housing 146, with the light housing 146 sandwiched between the main body portion 138 and the printed circuit board 190. The light sources 180 are sandwiched between the ends 142, 144 and the printed circuit board 190. In one or more embodiments, the light housing 146 includes at least one light housing opening 150 disposed adjacent to at least one tick mark 124. In one or more embodiments, the light housing opening 150 is disposed adjacent to each of the tick marks 124. In one or more embodiments, the light housing opening 150 is defined in part by an opening inner surface 152, which optionally has a roughness formed on the opening inner surface 152. The size and shape of the light housing opening 150 can be adjusted to optimize the desired luminance level. In one or more embodiments, the light housing opening 150 has a generally circular cross-sectional shape.

In one or more embodiments, the main body portion 138 has a surface roughness formed on the forward surface 134 and on the rear surface 136. Such surface roughness assists with the even distribution of light throughout the light guide 140. The roughness on the forward surface 134 is divided by the roughness on the rear surface 136 allows for substantially even illumination of the graphics 122 and tick marks 124.

The light guide 140 may be curved to correspond with the gauge surface 120, but is not necessarily parallel to the gauge surface 120. Accordingly, the example light guide 140 uniformly illuminates a concave gauge graphics 122 and surface 120 with light sources 180 mounted to a printed circuit board 190, while simultaneously illuminating the tick marks 124 that are formed as part of the light guide 140. The light guide 140 is configured to provide illumination to the graphics 122 graphics 123 and the plurality of tick marks 124.

Advantageously, the luminance of tick marks can be matched more closely to the uniformity of the remaining subjects. The amount of reflection or luminance received by the tick mark can be reduced, which will be less distracting to the driver. The embodiments herein can be adjustable to meet the demands of different shapes and lighting systems.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

What is claimed is:

1. A gauge assembly comprising:
    a gauge surface having at least one illuminable graphic defined thereon, the gauge surface defining a plurality of openings therethrough;
    a light guide having a main body portion disposed adjacent to the gauge surface, the light guide having a plurality of raised tick marks extending from the main body portion, each tick mark of the plurality of raised tick marks extending through an opening of the plurality of openings, the light guide including a first end and a second end, at least one of the first end and the second end curve away from the gauge surface to receive light, the light guide being configured to provide illumination to the at least one illuminable graphic and the plurality of tick marks;
    a light housing disposed adjacent to the light guide on a side of the main body portion opposite the gauge surface; and
    the light housing having at least one light housing opening defined by the light housing wherein the central axis of the at least one light housing opening is the same as a central axis of at least one of the plurality of raised tick marks, and wherein the at least one light housing opening is disposed adjacent to the respective at least one of the plurality of raised tick marks.

2. The gauge assembly of claim 1, wherein the light housing has at least one light housing opening disposed adjacent to each of the plurality of raised tick marks.

3. The gauge assembly of claim 1, wherein the plurality of tick marks are unitarily formed with the main body portion.

4. The gauge assembly of claim 1, wherein the light guide is at least one of transparent and translucent.

5. The gauge assembly of claim 1, wherein the at least one light housing opening is defined in part by an inner surface, the inner surface having a surface roughness which is greater than a surface roughness of the remaining surfaces of the light housing.

6. The gauge assembly of claim 1, wherein the main body portion of the light guide having a forward surface and a rear surface, the main body portion having surface roughness formed on the forward surface and on the rear surface which is greater than a surface roughness of the remaining surfaces of the light guide.

7. The gauge assembly of claim 1, further comprising a printed circuit board and a plurality of light sources disposed on the printed circuit board, the light sources being configured to emit light into the light guide, the light sources being disposed adjacent to the ends of the light guide.

8. The gauge assembly of claim 1, wherein the light housing opening has a generally rectangular cross-sectional shape.

9. A gauge assembly comprising:
    a gauge surface having at least one illuminable graphic defined thereon, the gauge surface defining a plurality of openings therethrough;
    a light guide having a main body portion disposed adjacent to the gauge surface, the light guide having a plurality of raised tick marks extending from the main body portion, each tick mark of the plurality of raised tick marks extending through an opening of the plurality of openings, the light guide including a first end and a second end that each curve away from the gauge surface to receive light, the light guide being configured to provide illumination to the at least one illuminable graphic and the plurality of raised tick marks;
    a light housing disposed adjacent to the light guide on a side of the main body portion opposite the gauge surface; and
    the light housing having at least one light housing opening defined by the light housing wherein the central axis of the at least one light housing opening is the same as the a central axis of the at least one of the plurality of raised tick marks, and wherein the at least one light housing opening is disposed adjacent to the respective at least one of the plurality of raised tick marks, wherein the at least one light housing opening is defined in part by an inner surface, the inner surface having a surface roughness which is greater than a surface roughness of the remaining surfaces of the light housing.

10. The gauge assembly of claim 9, wherein the plurality of raised tick marks are unitarily formed with the main body portion.

11. The gauge assembly of claim 9, wherein the light guide is translucent.

12. The gauge assembly of claim 9, wherein the main body portion of the light guide having a forward surface and a rear surface, the main body portion having surface roughness formed on the forward surface and on the rear surface which is greater than a surface roughness of the remaining surfaces of the light guide.

13. The gauge assembly of claim 9, further comprising a printed circuit board and a plurality of light sources disposed on the printed circuit board, the light sources being configured to emit light into the light guide, the light sources being disposed adjacent to the ends of the light guide.

14. The gauge assembly of claim 9, wherein the light guide opening has a generally circular cross-sectional shape.

* * * * *